Oct. 16, 1928.

C. A. SMITH ET AL 1,688,290

BRAKE LOCK

Filed Aug. 8, 1927

Inventors,
Charles A. Smith,
Walter G. Bowers.

By Victor J. Evans

Attorney

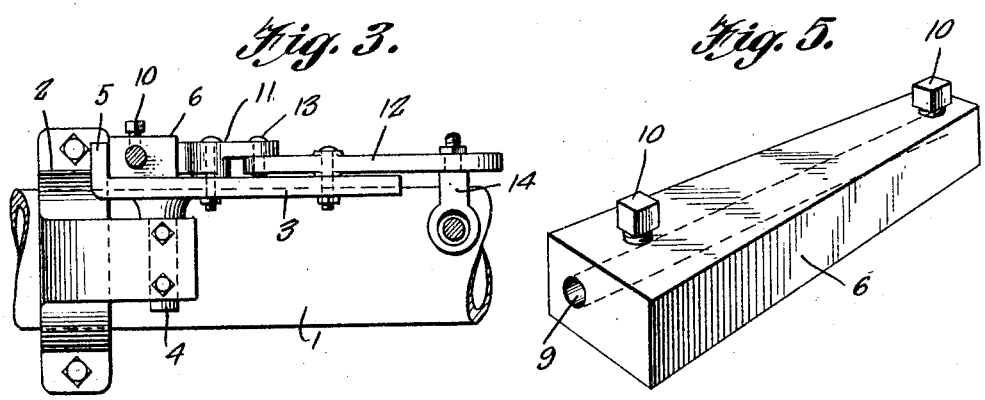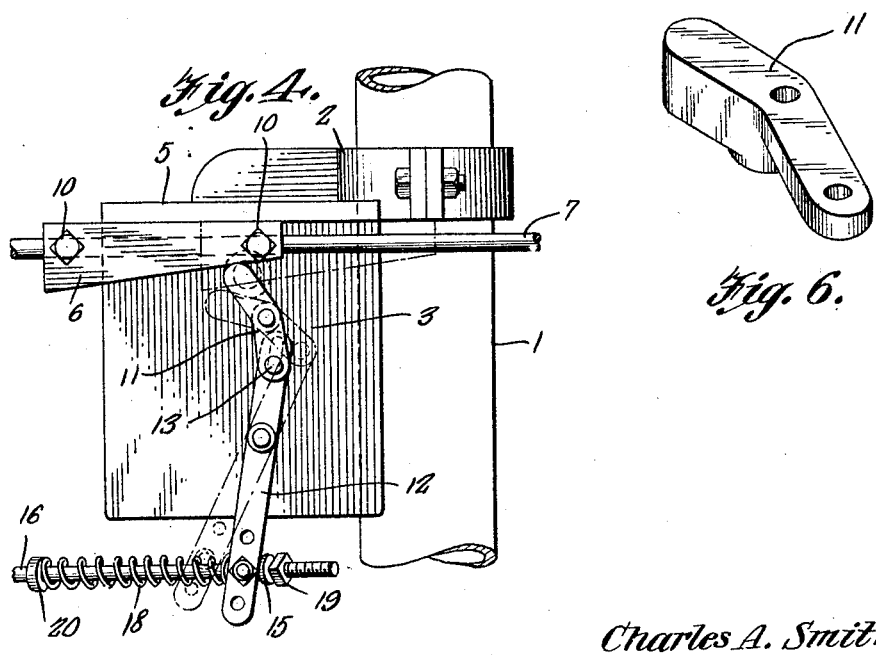
Charles A. Smith,
Walter G. Bowers,
Inventors

Patented Oct. 16, 1928.

1,688,290

UNITED STATES PATENT OFFICE.

CHARLES A. SMITH AND WALTER G. BOWERS, OF BARBERTON, OHIO.

BRAKE LOCK.

Application filed August 8, 1927. Serial No. 211,527.

This invention relates to brake locking means for a motor vehicle, the general object of the invention being to provide means for holding the foot brakes of the vehicle applied, while the clutch pedal is depressed, so that there is no danger of the vehicle rolling down an incline when the gears are being shifted and without requiring the operator to keep his foot on the brake pedal so that the foot which ordinarily manipulates the brake pedal is free to manipulate the accelerator.

Another object of the invention is to so form the parts that they can be easily attached to existing models of motor vehicles with but slight change thereto.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 3 is a section on line 3—3 of Figure 2.

Figure 4 is a plan view showing the various parts of the invention.

Figure 5 is a view of the wedge member for the brake rod.

Figure 6 is a view of the cam member.

Figure 1:
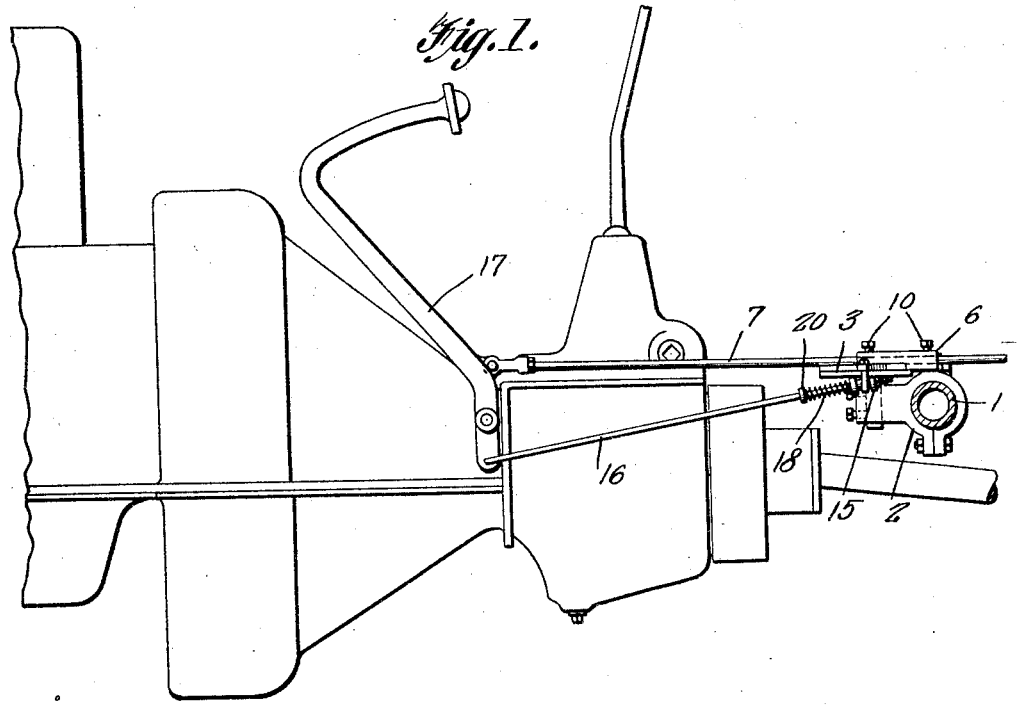
Figure 1 is an elevation of parts of a motor vehicle, showing the invention in use.
Figure 2:
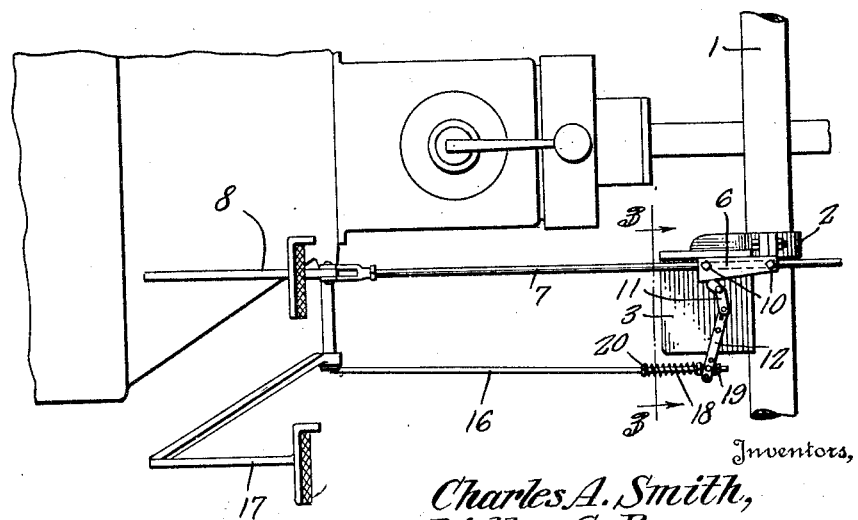
Figure 2 is a plan view of Figure 1.

In these views, 1 indicates a tubular rod which extends across the frame of the chassis of the motor and is suitably supported thereby and 2 indicates a bracket which is clamped to said rod. A plate 3 is formed with a depending part 4 which is fastened to the bracket so that the plate is supported in a horizontal position by said bracket. The inner edge of the plate is formed with an upstanding flange 5.

A wedge block 6 is clamped to the brake rod 7 which is attached to the brake pedal 8, the rod passing through a hole 9 formed in the block and the block being clamped to the rod by the bolts 10. This block is so positioned that it will engage the plate and its flange, as shown in dotted and full lines in Figure 4, during the movement of the brake rod by the pedal. A cam lever 11 is pivoted to the plate and a lever 12 is also pivoted to the plate and has a pin and slot connection 13 with the outer end of the cam lever. An eye bolt 14 is adjustably connected with the outer end of the lever 12 and a sleeve 15 passes through the eye of the bolt and is slidably arranged on a rod 16 which is connected with the lower end of the clutch pedal 17. A spring 18 on the rod 16 normally holds the sleeve against a nut 19 threaded on the end of the rod 16, the spring bearing against a collar 20 formed on said rod.

From the foregoing it will be seen that when the brake pedal is depressed to apply the foot brakes, the wedge block 6 is moved forwardly on the plate 3 from the dotted line position of Figure 4 to the full line position thereof, and then when the clutch is depressed, the rod 16 will rock the lever 12 and thus cause the cam lever to engage the small part of the wedge block and jam it between the cam lever and the flange 5 of the plate. Thus the brakes will be held in applied position as the wedge block will prevent the brake rod and the parts attached thereto from returning to normal position. In this way, the foot can be removed from the brake pedal and used on the accelerator without danger of the vehicle moving on an incline. When the foot is removed from the clutch, the parts will return to normal position, with the cam lever out of engagement with the wedge block so that the block is free to move under the action of the brake releasing springs on the rod 7.

This device can be easily installed on existing models of motor vehicles and it can be manufactured to sell at low cost. It will operate smoothly and without noise and does not in any way interfere with the proper operation of the vehicle.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. In a motor vehicle, a wedge member attached to the brake rod which is attached to the brake pedal, a supporting member on which the wedge member slides, a cam member for forcing the wedge member against a part of the supporting member and means for operating the cam member by the depression of the clutch pedal.

2. In a motor vehicle, a wedge block attached to the rod which is connected with the brake pedal, a supporting plate having a flange thereon on which the wedge member slides, a cam lever pivoted to the plate, a lever pivoted to the plate and connected with the cam lever, a rod connected with the lower end of the clutch pedal and means for yieldingly connecting the rod to the outer end of the lever so that the depression of the clutch pedal will cause said lever to move the cam lever against the wedge member to hold the member in position with the brakes applied.

In testimony whereof we affix our signatures.

CHARLES A. SMITH.
WALTER G. BOWERS.